(12) United States Patent
Lee

(10) Patent No.: US 11,392,008 B2
(45) Date of Patent: Jul. 19, 2022

(54) LIQUID LENS

(71) Applicant: LG INNOTEK CO., LTD., Seoul (KR)

(72) Inventor: Kyu Tae Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 224 days.

(21) Appl. No.: 16/475,527

(22) PCT Filed: Jan. 5, 2018

(86) PCT No.: PCT/KR2018/000265
§ 371 (c)(1),
(2) Date: Jul. 2, 2019

(87) PCT Pub. No.: WO2018/128467
PCT Pub. Date: Jul. 12, 2018

(65) Prior Publication Data
US 2019/0324346 A1    Oct. 24, 2019

(30) Foreign Application Priority Data

Jan. 6, 2017    (KR) .................. 10-2017-0002451

(51) Int. Cl.
*G02F 1/29*    (2006.01)
(52) U.S. Cl.
CPC ............... *G02F 1/29* (2013.01); *G02F 1/294* (2021.01); *G02F 2201/08* (2013.01); *G02F 2201/12* (2013.01)
(58) Field of Classification Search
CPC .............. G02F 1/29; G02F 1/294; G02B 3/14
See application file for complete search history.

(56) References Cited

U.S. PATENT DOCUMENTS

| 2010/0232028 A1* | 9/2010 | Takai | .................. G02B 3/14 359/626 |
| 2010/0284091 A1* | 11/2010 | Okamoto | ........... G02B 13/0075 359/665 |

FOREIGN PATENT DOCUMENTS

| JP | 2006-203011 | 8/2006 | |
| JP | 2010-025969 | 2/2010 | |
| JP | 2010-276716 | 12/2010 | |
| KR | 10-2008-0094037 | 10/2008 | |
| KR | 10-2010-0116580 | 11/2010 | |
| WO | WO-2008082025 A1 * | 7/2008 | ............... G02B 3/14 |

OTHER PUBLICATIONS

International Search Report (with English Translation) and Written Opinion dated Mar. 29, 2018 issued in Application No. PCT/KR2018/000265.

* cited by examiner

*Primary Examiner* — Jessica M Merlin
(74) *Attorney, Agent, or Firm* — KED & Associates LLP

(57) ABSTRACT

A liquid lens may include a first plate which accommodates a conductive liquid and a non-conductive liquid, has an opening formed therein and having a predetermined inclined surface, and is formed from silicon; a first electrode disposed on the first plate; a second electrode disposed under the first plate; a second plate disposed on the first electrode; a third plate disposed under the second electrode; and a light blocking layer disposed between the first plate and the third plate.

17 Claims, 6 Drawing Sheets

(a)  (b)

LIQUID LENS

CROSS-REFERENCE TO RELATED PATENT APPLICATIONS

This application is a U.S. National Stage Application under 35 U.S.C. § 371 of PCT Application No. PCT/KR2018/000265, filed Jan. 5, 2018, which claims priority to Korean Patent Application No. 10-2017-0002451, filed Jan. 6, 2017, whose entire disclosures are hereby incorporated by reference.

TECHNICAL FIELD

Embodiments relate to a liquid lens, a camera module including the same, and an optical device, and more particularly to a lens enabling adjustment of a focal length using electrical energy.

BACKGROUND ART

People who use portable devices demand optical devices that have high resolution, are small, and have various photographing functions (an optical zoom-in/zoom-out function, an auto-focusing (AF) function, a handshake compensation or optical image stabilization (OIS) function, etc.). Such photographing functions may be realized by directly moving a plurality of lenses that are combined. In the case in which the number of lenses is increased, however, the size of an optical device may be increased. The auto-focusing and handshake compensation functions are performed by tilting or moving a lens module including a plurality of lenses, which are fixed to a lens holder in the state in which the optical axes of the lens are aligned, along the optical axis or in a direction perpendicular to the optical axis. An additional lens moving apparatus is used to move the lens module. However, the lens moving apparatus has high power consumption, and an additional cover glass needs to be provided separately from the camera module in order to protect the lens moving apparatus, thus leading to an increase in the overall thickness of an optical device.

Therefore, research has been conducted on a liquid lens configured to electrically adjust the curvature of an interface between two kinds of liquid in order to perform auto-focusing and handshake compensation functions.

DISCLOSURE

Technical Problem

Embodiments provide a liquid lens enabling adjustment of a focal length using electrical energy and a camera module including the same, in which a housing structure accommodating a liquid is formed of silicon (Si), thus further simplifying a process of manufacturing the lens.

In addition, embodiments provide a lens, in which a structure capable of adjusting a focal length is manufactured by patterning a silicon wafer (Si wafer), thus overcoming a process error.

However, the objects to be accomplished by the disclosure are not limited to the above-mentioned objects, and other objects not mentioned will be clearly understood by those skilled in the art from the following description.

Technical Solution

In one embodiment, a liquid lens may include a first plate formed of a silicon material and accommodating a conductive liquid and a non-conductive liquid, including an opening formed therein, and the opening having a predetermined inclined surface, a first electrode disposed on the first plate, a second electrode disposed under the first plate, a second plate disposed on the first plate, a third plate disposed under the first plate, and a light-blocking layer disposed on or under the first plate to restrict the quantity of light that passes through an open region in which the opening is formed.

In addition, the light-blocking layer may include a light-absorbing material, which is disposed on at least one of the second plate or the third plate and defines an open surface.

In addition, the light-blocking layer may be formed in the shape of a ring, which is disposed between at least one of the second plate or the third plate and the first plate and defines an open surface.

In addition, the light-blocking layer may include a plate structure including a hole formed therein, which is disposed between at least one of the second plate or the third plate and the first plate and defines an open surface.

In addition, each of the second plate and the third plate may include a glass layer.

In addition, the inclined surface may be inclined at an angle of 55° to 65°.

In addition, the open region may be formed in the shape of a hole that has a circular-shaped cross-section.

In addition, the first electrode and the second electrode may include chrome (Cr), and the first plate, the second plate, and the third plate may be bonded to each other via the first electrode and the second electrode including chrome (Cr).

In addition, the inner side portion of the light-blocking layer may be disposed so as to be closer to the optical axis than the inner side portion of the inclined surface formed in the opening.

In addition, the portion at which the upper surface or the lower surface of the first plate is connected to the inclined surface formed in the opening in the first plate may have a rounded shape.

In addition, the open region that is defined by the upper side or the lower side of the first plate may have a circular shape, the boundary of the open region may include an uneven portion, and the light-blocking layer may be disposed at a position corresponding to the boundary including the uneven portion.

In addition, a portion of the open region that is located at the upper side of the first plate may be larger than a portion of the open region that is located at the lower side of the first plate.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of embodiments will be described below.

According to the embodiments, in a lens enabling adjustment of a focal length, a housing of a liquid is manufactured using a silicon wafer, and thus it is possible to reduce manufacturing costs of the lens and a camera including the lens and to improve the productivity thereof.

In addition, according to the embodiments, in a lens enabling adjustment of a focal length, a glass structure is substituted with a silicon structure, thereby further securing flexibility in the manufacturing process.

However, the effects achievable through the disclosure are not limited to the above-mentioned effects, and other effects not mentioned will be clearly understood by those skilled in the art from the following description.

BEST MODE

Figure 1:
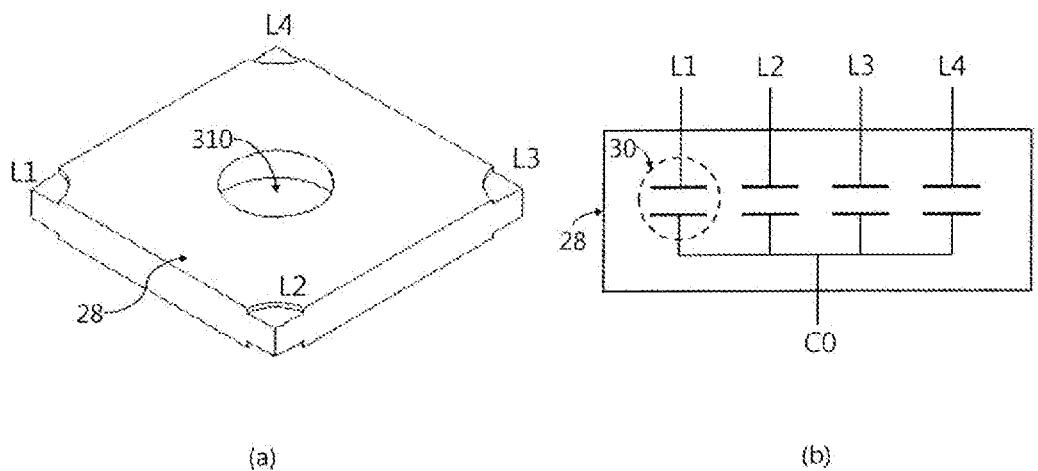
FIGS. 1(a) and 1(b) are, respectively, a perspective view and an equivalent circuit of a liquid lens.

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

With relation to a camera module that is mounted in a small-sized portable device and includes a plurality of lenses, it is very difficult to realize an optical zoom-in/zoom-out function, an auto-focusing (AF) function, and a hand-shake compensation or optical image stabilization (OIS) function through a method of changing a focal length by adjusting the distance between the lenses.

One of the methods for solving the above problem is to make a lens using liquid, rather than using transparent and hard glass or plastic. In the case in which a lens is made of liquid, the focal length of the lens may be adjusted through an electrowetting phenomenon.

A liquid lens using an electrowetting phenomenon may reduce the size of a camera module compared to a configuration in which a focal length is adjusted by moving a lens (adjusting the distance between lenses), and may consume a small amount of power compared to a configuration in which a lens is mechanically moved using a motor or the like.

FIG. 1 is a view showing a liquid lens. Specifically, FIG. 1(a) illustrates a perspective view of a liquid lens 28, the focal length of which is adjusted in response to a driving voltage, and FIG. 1(b) illustrates an equivalent circuit of the liquid lens 28 shown in FIG. 1(a).

Referring to FIG. 1(a), the liquid lens 28 may receive a driving voltage through a first electrode, which includes at least one electrode sector C0, and a second electrode, which is disposed opposite the first electrode and includes a plurality of electrode sectors L1, L2, L3 and L4. The first electrode may be a common electrode, and the second electrode may be an individual electrode. When a driving voltage is applied through the electrode sectors L1, L2, L3 and L4 of the second electrode, the interface between a conductive liquid and a non-conductive liquid formed in a lens region 310 may be deformed.

Further, referring to FIG. 1(b), the liquid lens 28 may be defined as a plurality of capacitors 30, one side of each of which is connected to a corresponding one of the electrode sectors L1, L2, L3 and L4 of the second electrode and the other side of each of which is connected to the electrode sector C0 of the first electrode, thereby receiving a driving voltage.

Figure 2:
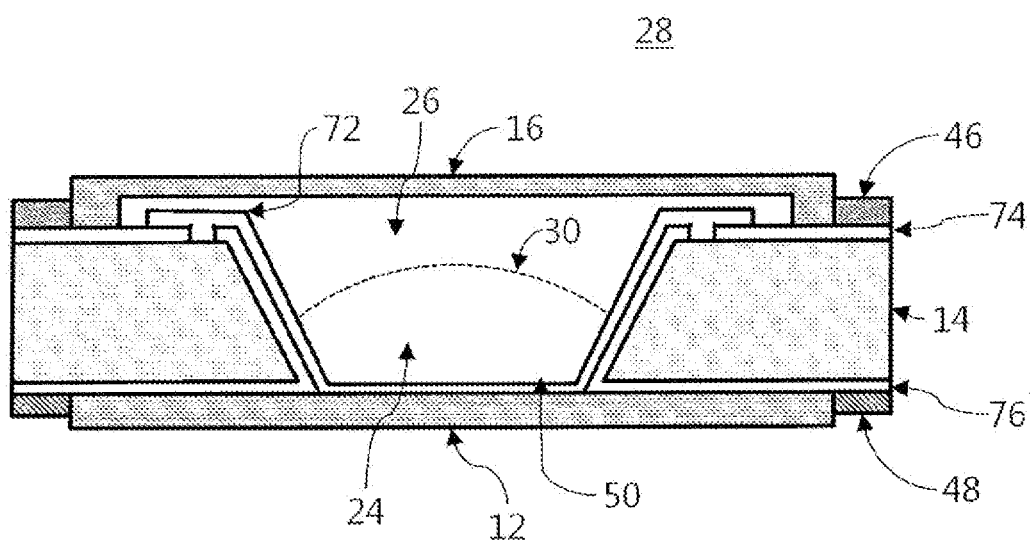
FIG. 2 is a cross-sectional view of the liquid lens according to an embodiment.

FIG. 2 is a cross-sectional view of the liquid lens 28 according to the embodiment.

The liquid lens 28 shown in FIG. 2 may include first, second and third plates 14, 16 and 12. Each of the second and third plates 16 and 12 includes a transparent material. The first plate 14 may be disposed between the second plate 16 and the third plate 12, and may include an open region having a predetermined inclined surface.

In addition, the liquid lens 28 may include a cavity 50 formed therein. The cavity 50 may be determined (or defined) by the third plate 12, the second plate 16, and the open region. Here, the cavity 50 is a space in which two liquids 24 and 26 having respectively different properties (e.g. a conductive liquid and a non-conductive liquid) may be charged. An interface 30 may be formed between the two liquids 24 and 26 having respectively different properties.

Further, at least one of the two liquids 24 and 26 included in the liquid lens 28 may be conductive.

In addition, the liquid lens 28 may further include an insulation layer 72. The insulation layer 72 may be disposed on the inclined surface, on which two electrodes 74 and 76, which are respectively disposed on and under the first plate 14, contact the conductive liquid. That is, the insulation layer 72 may cover one electrode 76 of the two electrodes 74 and 76, and may expose a portion of the other electrode 74 so that electrical energy is applied to the conductive liquid (e.g. 26). Described in detail, the insulation layer 72 may be disposed on the electrode 76 that is disposed on the inclined surface and the upper surface of the first plate 14. Further, the insulation layer 72 may be disposed so as to cover only a portion of the other electrode 74, which is disposed on the upper surface of the first plate 14 so as to be spaced apart from the electrode 76.

In addition, the liquid lens 28 may further include two substrates 46 and 48 for transmitting a driving voltage to the two electrodes 74 and 76.

When at least one of the flexure or the inclination of the interface 30 formed in the liquid lens 28 changes, the focal length of the liquid lens 28 may be adjusted. The region in which an optical signal passes through the interface 30 may correspond to the lens region 310, which is described with reference to FIG. 1.

The first plate 14 may be formed of a silicon material, and may serve as a housing structure in the liquid lens 28, in which two kinds of liquid having respectively different properties are accommodated. The first plate 14 may be manufactured using a silicon wafer. Each of the third plate 12 and the second plate 16 includes a region through which an optical signal passes, but the first plate 14 does not need to transmit an optical signal therethrough.

For example, the third plate 12 and the second plate 16 may be formed of a material having high transparency, such as glass, so as to transmit an optical signal therethrough.

For example, the first plate 14 may be formed of a silicon material. Alternatively, the first plate 14 may be formed of a material that is capable of absorbing an optical signal without transmitting the optical signal therethrough in order to remove noise.

In a related art, the first plate 14 is implemented as a glass layer, which is formed of a material such as glass, rather than silicon (Si). Since both the third plate 12 and the second plate 16 are formed of glass, it may be easy to prevent the liquid charged in the cavity 50 from flowing out when an intermediate layer formed of the same material is used for bonding.

However, processing a glass layer in a specific form incurs an increase in manufacturing costs. In the case in which the first plate 14, which includes silicon, is disposed between the third plate 12 and the second plate 16, which include glass, it may be difficult to realize a completely hermetic seal.

For example, an anodic bonding method or a direct wafer bonding method may be used to directly bond silicon and glass to each other. However, this kind of bonding requires a clean and flat surface and a high temperature. Further, when different kinds of materials (i.e. glass and silicon) are bonded to each other, a large thermal stress is generated due to the difference in thermal expansion coefficient therebetween. In order to overcome this, an adhesive may be used to bond the same kind of material or different kinds of materials to each other at a low temperature. In this case, however, the bonding portion has low thermal stability, and it is difficult to realize a completely hermetic seal. In order to overcome this, a bonding method using spin-on-glass (SOG) may be used. This is a method using a sol-gel process at a low temperature, and forms a siloxane bond (═Si—O—Si) through hydrolysis and a water condensation reaction, thus enabling bonding at a low temperature.

Although not illustrated, besides the anodic bonding method and the direct wafer bonding method, a bonding method using an electrode layer or an electrode pattern may be used in order to completely hermetically seal the first plate 14, the third plate 12, and the second plate 16. As described with reference to FIG. 1, the electrode layers and the electrode patterns for forming the electrode sectors L1, L2, L3 and L4 of the second electrode and the electrode sector C0 of the first electrode may be disposed on both sides of the first plate 14, which are in contact with the third plate 12 and the second plate 16.

Here, the electrode layers and the electrode patterns may include chrome (Cr). Chromium or chrome is a glossy silver rigid transition metal, which is not fragile, does not readily discolor, and has a high melting point. However, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid charged in the cavity 50. It is possible to increase the bonding force between the third and second plates 12 and 16, which are formed of a glass material, and the first plate 14 using the electrode layers including chrome (Cr) by applying high-temperature heat thereto.

As described above, the liquid lens 28 according to the embodiment may include the first plate 14, the first electrode 74, the second electrode 76, the second plate 16, and the third plate 12.

The first plate 14 may include an opening formed therein to accommodate the conductive liquid 26 and the non-conductive liquid 24 and to include a predetermined inclined surface, and may be formed of a silicon material. The first electrode 74 may be disposed on the first plate 14, and the second electrode 76 may be disposed under the first plate 14. The second plate 16 may be disposed on the first plate 14, and the third plate 12 may be disposed under the first plate 14.

Figure 3:
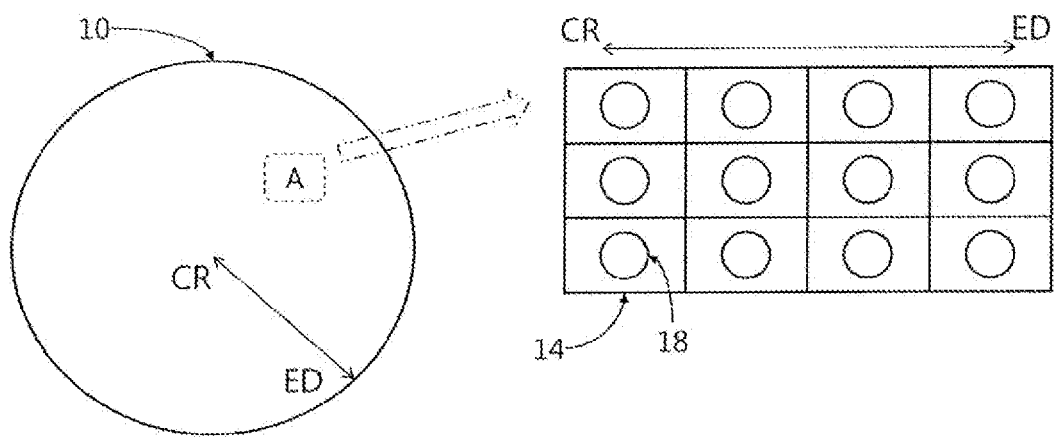
FIG. 3 is a view showing a housing structure according to an embodiment, which is manufactured using a silicon wafer.

FIG. 3 is a view showing a housing structure according to an embodiment, which is manufactured using a silicon wafer.

As shown in FIG. 3, a plurality of first plates 14, which are used as a housing structure of the liquid lens 28, may be formed on a silicon wafer 10. The size of the silicon wafer 10 may range from 50 nm to 300 mm. As the size of the silicon wafer 10 increases, it is possible to form a greater number of first plates 14, thus leading to a reduction in manufacturing costs and improvement of productivity.

For example, when the silicon wafer 10 has a diameter of 300 mm, each of the length and the width of the first plate 14 may be about 6 mm.

Referring to the enlarged view of some areas A of the silicon wafer 10 shown in FIG. 3, a plurality of first plates 14 is formed on the silicon wafer 10. An open region 18 may be formed in each of the first plates 14 through a patterning process.

The manufacturing process using the silicon wafer 10 may cause process variation (tolerance) between a center portion CR thereof and an edge area (ED). That is, it is most desirable for several tens to several hundreds of first plates 14, which are all formed together on the silicon wafer 10, to have a uniform shape. However, a difference in shape may occur between the first plate 14 located at the center portion CR and the first plate 14 located at the edge area ED due to process variation therebetween.

For example, when the patterning process is performed on the basis of the center portion CR of the silicon wafer 10, a desired degree of etching may not be realized in the edge area ED. On the other hand, when the patterning process is performed such that a desired degree of etching is realized in the edge area ED of the silicon wafer 10, the center portion CR may be excessively etched. The reverse situation may also occur depending on the processing conditions or environment.

Figure 4:
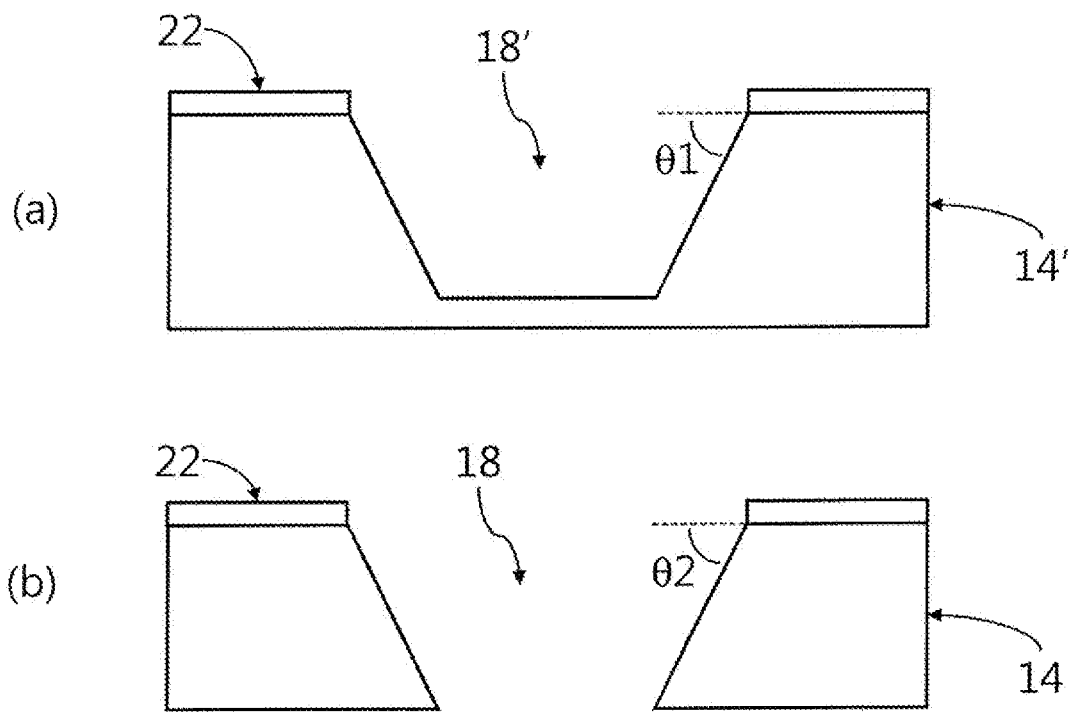
FIGS. 4(a) and 4(b) are cross-sectional views showing patterning of the housing structure according to the embodiment.

FIGS. 4(a) and 4(b) are cross-sectional views showing patterning of the housing structure according to the embodiment. Anisotropic wet etching for forming a trench 18' in a silicon substrate 14', which is used in a semiconductor device, will be described with reference to FIG. 4(a), and anisotropic wet etching for manufacturing the first plate 14, which is included in the liquid lens 28, will be described with reference to FIG. 4(b).

First, referring to FIG. 4(a), in order to form the trench 18' in the silicon substrate 14' in the semiconductor device such as a memory device, a mask pattern 22 may be formed on the silicon substrate 14' through a photolithography process. Thereafter, a portion of the silicon substrate 14' that is exposed through the mask pattern 22 may be patterned using an etching solution. In the anisotropic wet etching process using an etching solution, variation may occur depending on processing conditions (time, etc.). However, it may be possible to form the trench 18' at an angle Θ1 of about 55°.

On the other hand, unlike the trench 18' of a general semiconductor device, the open region 18, which is formed in the first plate 14 included in the liquid lens 28, may require an inclined surface having an angle θ2 of about 50° to 70°, specifically about 55° to 65°. To this end, over-etching may be performed in the process of forming the open region 18 through the anisotropic wet etching process. The inclined surface of the first plate 14, which is included in the liquid lens 28, may be inclined at an angle of 56° to 64° through over-etching.

Figure 5:
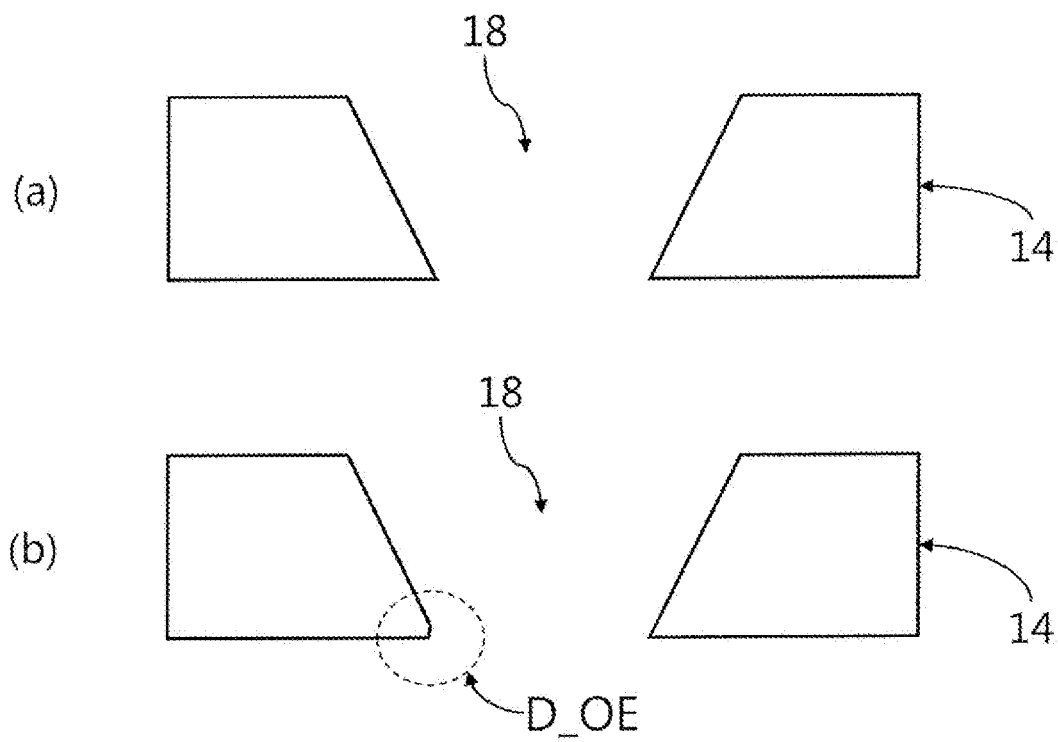
FIGS. 5(a) and 5(b) are cross-sectional views showing deformation of the housing structure due to a process error of a silicon wafer.

FIGS. 5(a) and 5(b) are cross-sectional views showing deformation of the housing structure due to a process error of a silicon wafer. Specifically, FIG. 5(a) shows a housing structure patterned without a process error, and FIG. 5(b) shows the case in which a portion of the housing structure is damaged due to over-etching.

First, as shown in FIG. 5(a), the first plate 14 may be patterned on the silicon wafer 10 (refer to FIG. 3) so as to have an inclined surface and an open region 18 having a desired shape, with a process error minimized.

However, as shown in FIG. 5(b), there may occur a phenomenon in which an edge portion D_OE of the open region 18 of the first plate 14 becomes blunt due to over-etching of a portion of the silicon wafer 10. Such a slight process error may deteriorate the productivity of the first plate 14.

The liquid lens may further include a light-blocking layer in order to prevent the phenomenon in which the edge portion D_OE of the open region 18 of the first plate 14 in the liquid lens 28 becomes blunt.

The light-blocking layer may be disposed on or under the first plate 14 to restrict the quantity of light that passes through the open region. For example, the light-blocking layer may be implemented in various forms such as an auxiliary structure, a thin film, and a coating film.

Figure 6:
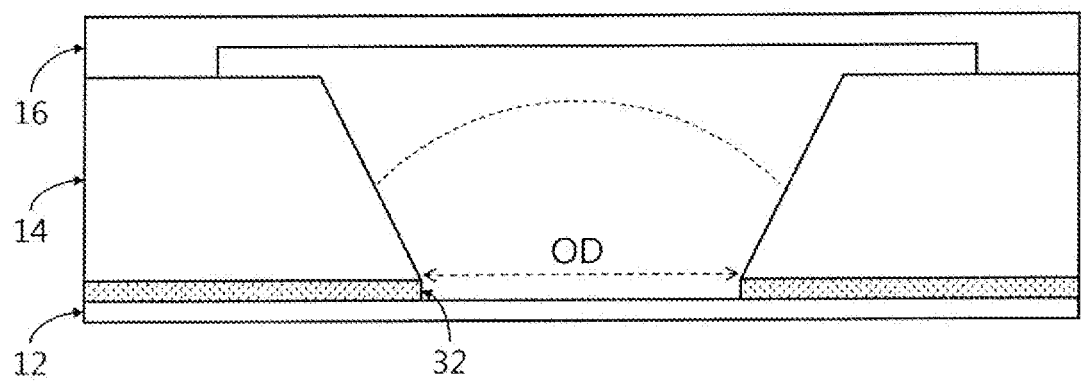
FIG. 6 is a cross-sectional view of a first example of the liquid lens.

FIG. 6 is a cross-sectional view of a first example 28A of the liquid lens.

As shown in FIG. 6, the liquid lens 28A may include a third plate 12 and a second plate 16, which are transparent, and may further include a first plate 14, which is disposed between the third plate 12 and the second plate 16 and includes an open region including a predetermined inclined surface. In addition, the liquid lens 28A may include an auxiliary structure 32 to compensate for a process error of the first plate 14.

As described with reference to FIG. 5(b), the edge of the inclined surface of the first plate 14, which is formed of a silicon material, may have a blunt or rounded shape. That is, the open region, which is defined by the first plate 14, may not have a uniform boundary due to deformation of the pattern caused by over-etching. The open region may not be formed in a circular shape, the boundary of the open region may be irregular or uneven, or a connecting surface may be additionally formed between the inclined surface and the lower surface. In order to compensate the defect of the first plate 14, the auxiliary structure 32 may be disposed.

Here, the auxiliary structure 32 may be disposed outside the first plate 14 to define an open surface OD of the open region. Specifically, the auxiliary structure 32 may include a plate structure, which is disposed between the third plate 12 and the first plate 14 and includes a hole formed therein to define the open surface OD. The plate structure may define the open surface OD through the circular hole, and may be bonded to the first plate 14. Thus, even when the pattern is deformed due to a process error (refer to FIG. 5(a)), the first plate 14 may be applied to the liquid lens 28A without any problem.

The auxiliary structure 32 may be a plate structure, and may be implemented as a conductive metal plate, a thin film, or a film. In addition, a light-blocking layer, which determines the size of the open region, may be disposed on one surface of any one of the third plate 12 and the first plate 14 through a coating or deposition method. The light-blocking layer may include a black resin. However, the embodiment is not limited thereto. For example, the auxiliary structure 32 may serve as the light-blocking layer.

Figure 7:
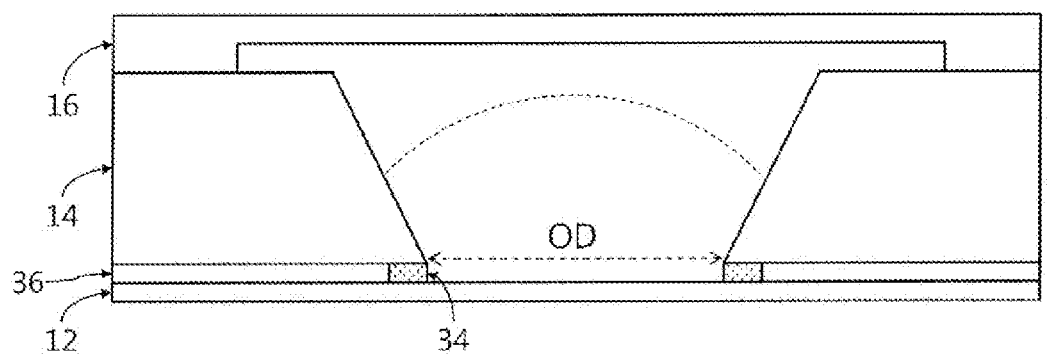
FIG. 7 is a cross-sectional view of a second example of the liquid lens.

FIG. 7 is a cross-sectional view of a second example 28B of the liquid lens.

As shown in FIG. 7, the liquid lens 28B may include a third plate 12 and a second plate 16, which are transparent, and may further include a first plate 14, which is disposed between the third plate 12 and the second plate 16 and includes an open region including a predetermined inclined surface. In addition, the liquid lens 28B may include an auxiliary structure 34 to compensate for a process error of the first plate 14. As described with reference to FIG. 5(b), the edge of the inclined surface of the first plate 14, which is formed of a silicon material, may have a blunt or rounded shape. Further, the lower end of the inclined surface of the first plate may have an uneven or rounded shape. This may be caused by over-etching or under-etching.

Here, the auxiliary structure 34 may be disposed outside the first plate 14 to define an open surface OD of the open region. Specifically, the auxiliary structure 34 may include a ring structure, which is disposed between the third plate 12 and the first plate 14 to define the open surface OD. The ring structure may define the open surface OD through a circular hole, and may be bonded to the first plate 14. Thus, even when the pattern is deformed due to a process error (refer to FIG. 5(b)), the first plate 14 may be applied to the liquid lens without any problem. In the case in which a ring structure is used as the auxiliary structure 34, a buffer layer 36 may be additionally disposed in order to eliminate the gap between the first plate 14 and the third plate 12. The buffer layer 36 may be disposed between the first plate 14 and the third plate 12 so as to be adjacent to the open surface OD.

The ring structure, which is used as the auxiliary structure 34, may be implemented as a conductive metal ring or a thin-film-shaped or film-shaped ring.

Figure 8:
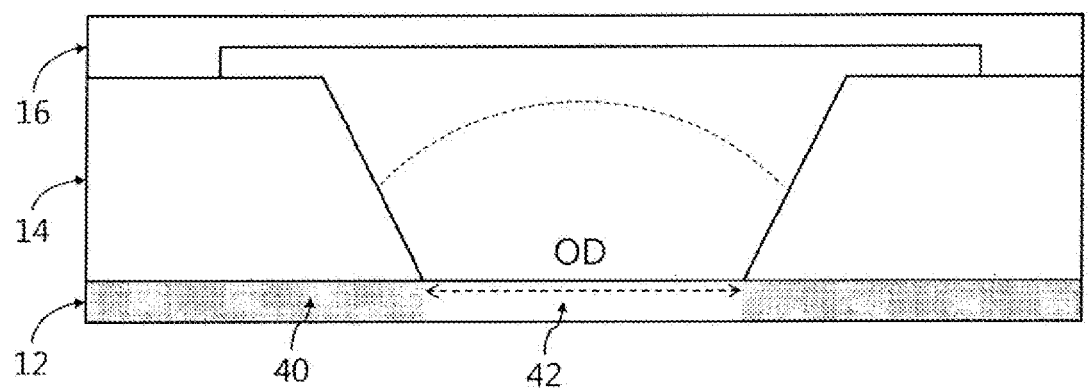
FIG. 8 is a cross-sectional view of a third example of the liquid lens.

FIG. 8 is a cross-sectional view of a third example 28C of the liquid lens.

As shown in FIG. 8, the liquid lens 28C may include a third plate 12 and a second plate 16, which are transparent, and may further include a first plate 14, which is disposed between the third plate 12 and the second plate 16 and includes an open region including a predetermined inclined surface. In addition, the liquid lens 28C may further include an auxiliary structure 40 to compensate for a process error of the first plate 14. As described with reference to FIG. 5(b), the edge of the inclined surface of the first plate 14, which is formed of a silicon material, may have a blunt or rounded shape.

Here, the auxiliary structure 40 may be disposed outside the first plate 14 to define an open surface OD of the open region. Specifically, the auxiliary structure 40 may be implemented as a light-absorbing material, which is included in the third plate 12 or adhered to the third plate 12 and includes a hole formed therein to define the open surface OD. Here, the third plate 12 may be a transparent layer (or a light-transmitting layer), which is formed of a material such as glass, and may include a transparent region (or a light-transmitting region) 42, through which an optical signal passes, and a region other than the transparent region 42. The light-absorbing material 40 may be coated on or included in the region other than the transparent region 42. The light-absorbing material 40 may define the open surface OD by defining the circular transparent region 42. The third plate 12 may be bonded to the first plate 14, and thus even when the pattern is deformed due to a process error (refer to FIG. 5(b)), the first plate 14 may be applied to the liquid lens 28C without any problem.

Figure 9:
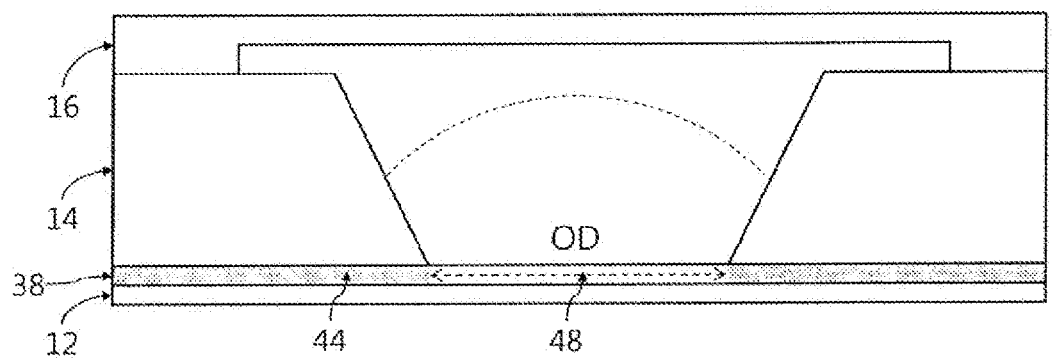
FIG. 9 is a cross-sectional view of a fourth example of the liquid lens.

FIG. 9 is a cross-sectional view of a fourth example of the liquid lens.

As shown in FIG. 9, the liquid lens 28D may include a third plate 12 and a second plate 16, which are transparent, and may further include a first plate 14, which is disposed between the third plate 12 and the second plate 16 and includes an open region including a predetermined inclined surface. In addition, the liquid lens 28D may include an auxiliary structure 38 to compensate for a process error of the first plate 14. As described with reference to FIG. 5(b), the edge of the inclined surface of the first plate 14, which is formed of a silicon material, may have a blunt or rounded shape.

Here, the auxiliary structure 38 may be disposed outside the first plate 14 to define an open surface OD of the open region. Specifically, the auxiliary structure 38 may include a plate structure, which is disposed between the third plate 12 and the first plate 14 and includes a transparent region (or a light-transmitting region) 48 to define the open surface OD. The plate structure may define the open surface OD through the circular transparent region 48, and may be bonded to the first plate 14. Thus, even when the pattern is deformed due to a process error (refer to FIG. 5(a)), the first plate 14 may be applied to the liquid lens without any problem.

The auxiliary structure 38 may be a plate structure, may be implemented such that a light-absorbing material 44 is included in a transparent material 48, or may be implemented as a flat plate, a thin film, or a film in which a transparent material 48 and an opaque material 44 are mixed with each other.

Figure 10:
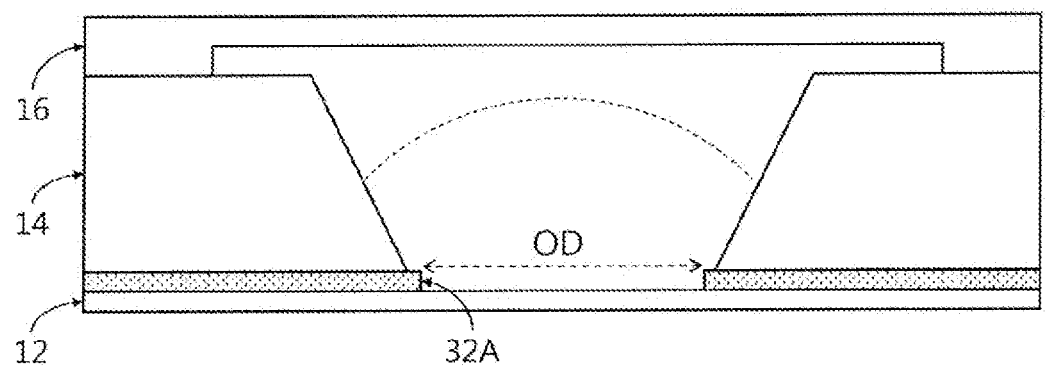
FIG. 10 is a cross-sectional view of a fifth example of the liquid lens.

FIG. 10 is a cross-sectional view of a fifth example of the liquid lens.

As shown in FIG. 10, the liquid lens 28E may include a third plate 12 and a second plate 16, which are transparent, and may further include a first plate 14, which is disposed between the third plate 12 and the second plate 16 and includes an open region including a predetermined inclined surface. As described with reference to FIG. 5(b), the edge of the inclined surface of the first plate 14, which is formed of a silicon material, may have a blunt or rounded shape. In addition, the liquid lens 28E may include an auxiliary structure 32A to compensate for a process error of the first plate 14. Here, the auxiliary structure 32A may be disposed outside the first plate 14 to define an open surface OD of the open region. The inner side portion of the auxiliary structure 32A may be disposed so as to be closer to the optical axis than the inner side portion of the inclined surface formed in the open region.

As described above with reference to FIGS. 6 to 10, various types of auxiliary structures may be disposed between the first plate 14 and the third plate 12. However, the auxiliary structure may be formed outside the third plate 12 (below in the drawing). For example, the open region defined by the first plate 14 may have a circular shape, and the boundary of the open region may be uneven. Here, the auxiliary structure or the light-blocking layer may be disposed so as to be closer to the center of the open region than to the boundary of the open region. Thus, even when the boundary of the open region defined by the first plate 14 collapses, the auxiliary structure or the light-blocking layer may compensate for this. The light-blocking layer may include a hole formed at a position corresponding to the opening in the first plate, and the hole in the light-blocking layer may be located within the opening in the first plate when viewed from above the opening in the first plate. Further, the size of the hole in the light-blocking layer may be smaller than the minimum size of opening in the first plate. The light transmittance of the light-blocking layer may be lower than the light transmittance of the first plate.

Although the case in which the bottom portion of the first plate 14 (corresponding to the narrow portion of the open region) collapses or is deformed due to over-etching is shown by way of example in FIG. 5(b), the top portion of the first plate 14 (corresponding to the broad portion of the open region) may also collapse or be deformed. Depending on the embodiment, the auxiliary structure may be disposed between the first plate 14 and the second plate 16 in order to compensate for the deformation of the first plate 14, which is formed of a silicon material. For example, the open region defined by the light-blocking layer disposed under the first plate 14 may be smaller than the open region defined by the light-blocking layer disposed on the first plate 14.

Figure 11:
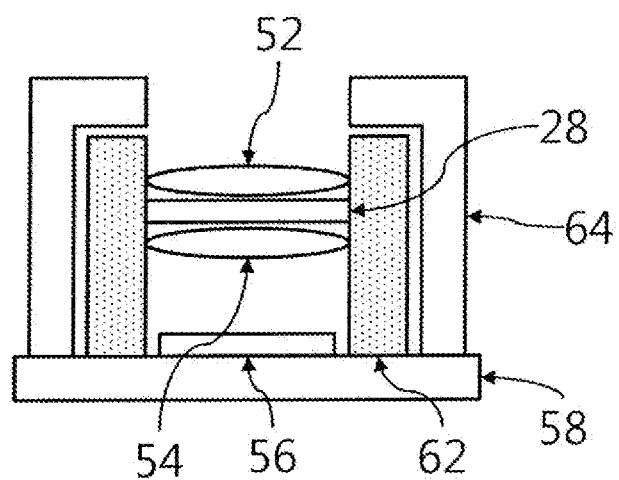
FIG. 11 is a cross-sectional view of a camera module according to an embodiment.

FIG. 11 is a cross-sectional view of a camera module according to an embodiment.

As shown in FIG. 11, the camera module may include a lens assembly, which includes a liquid lens 28, a first lens unit 52 disposed on the liquid lens 28, and a second lens unit 54 disposed under the liquid lens 28, an infrared cutoff filter (not shown), a printed circuit board 58, an image sensor 56, and a controller (not shown). However, at least one of the infrared cutoff filter or the controller may be omitted from or modified in the camera module. The liquid lens 28, the first lens unit 52, and the second lens unit 54 may be supported by and coupled to a holder or a lens barrel 62.

In addition, the camera module may further include a cover 64 surrounding the lens assembly and the image sensor 56.

The infrared filter may prevent infrared light from being incident on the image sensor 56. The infrared filter may be disposed between the lens assembly and the image sensor 56. The infrared filter may be an infrared absorption filter or an infrared reflection filter. Alternatively, the infrared filter may not be separately disposed, but may be coated or deposited on any one surface of the liquid lens 28.

The upper surface of the printed circuit board 58 and the liquid lens 28 may be electrically connected to each other. The image sensor 56 may be disposed on the printed circuit board 58. The printed circuit board 58 may be electrically connected to the image sensor 56. In one example, a holder member may be disposed between the printed circuit board 58 and the lens assembly. Here, the holder member may accommodate the image sensor 56 therein. The printed circuit board 58 may supply power (current or voltage) to the liquid lens 28. Meanwhile, the controller for controlling the liquid lens 28 may be disposed on the printed circuit board 58.

The camera module described above may be included in an optical device (or an optical instrument). Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens 28. In addition, the optical device may be implemented in a portable device such as, for example, a smart phone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed to limit the disclosure in all aspects and to be considered by way of example. The scope of the disclosure should be determined by reasonable interpretation of the accompanying claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens, a camera module including the same, and an optical device according to embodiments may be used in portable devices, such as camera/video devices, telescopic devices, microscopic devices, an interferometer, a photometer, a polarimeter, a spectrometer, a reflectometer, an auto-collimator, a lens-meter, a smart phone, a laptop computer, and a tablet computer.

The invention claimed is:

1. A liquid lens, comprising:
    a first plate formed of a silicon material, the first plate accommodating a conductive liquid and a non-conductive liquid, including an opening region formed therein, and the opening region having an inclined surface;
    a first electrode disposed on the first plate;
    a second electrode disposed under the first plate;
    a second plate disposed on the first electrode;
    a third plate disposed under the second electrode; and
    an auxiliary structure disposed between the first plate and the third plate to define an open surface of the opening region,
    wherein an inner side portion of the auxiliary structure is disposed so as to be closer to an optical axis than a boundary of the opening region formed by an inne side portions of the inclined surface.

2. The liquid lens according to claim 1, wherein the inclined surface is inclined at an angle of 55° to 65°.

3. The liquid lens according to claim 1, wherein the second plate and the third plate are formed of a glass material.

4. The liquid lens according to claim 1, wherein the first electrode and the second electrode comprise chrome (Cr), and
    wherein the first plate, the second plate, and the third plate are bonded to each other via the first electrode and the second electrode comprising chrome (Cr).

5. The liquid lens according to claim 1, wherein the inclined surface comprises a lower end having an uneven or rounded shape.

6. The liquid lens according to claim 1, wherein the second electrode is disposed between the first plate and the auxiliary structure.

7. A liquid lens, comprising:
    a first plate accommodating a conductive liquid and a non-conductive liquid, the first plate comprising an opening region formed therein;
    a first electrode disposed on the first plate;
    a second electrode disposed under the first plate;
    a second plate disposed on the first electrode, the second plate being formed of a glass material;
    a third plate disposed under the second electrode, the third plate being formed of a glass material;
    a light-blocking layer disposed between the first plate and the third plate, the light-blocking layer having a conductive metal ring structure having a circular shape that is bonded between the first plate and the third plate so as to form a gap between the first plate and the third plate; and
    a buffer layer disposed within the gap between the first plate and the third plate.

8. The liquid lens according to claim 7, wherein the opening region includes an inclined surface.

9. The liquid lens according to claim 7, wherein the light-blocking layer defines an open surface of the opening region.

10. The liquid lens according to claim 8, wherein the inclined surface is inclined at an angle of 55° to 65°.

11. The liquid lens according to claim 7, wherein the opening region is formed in the shape of a hole that has a circular-shaped cross-section.

12. The liquid lens according to claim 8, wherein an inner side portion of the light-blocking layer is disposed so as to be closer to an optical axis than an inner side portion of the inclined surface formed in the opening region.

13. The liquid lens according to claim 8, wherein a portion at which a top surface or a lower surface of the first plate is connected to the inclined surface formed in the opening region in the first plate has a rounded shape.

14. The liquid lens according to claim 7, wherein a region occupied by the opening region that is defined by an upper side or a lower side of the first plate has a circular shape.

15. The liquid lens according to claim 14, wherein a boundary of the region occupied by the opening region includes an uneven portion.

16. The liquid lens according to claim 15, wherein the light-blocking layer is disposed at a position corresponding to the boundary including the uneven portion.

17. The liquid lens according to claim 7, wherein a region that is located at an upper side of the first plate among a region occupied by the opening region is larger than a region that is located at a lower side of the first plate among the region occupied by the opening region.

\* \* \* \* \*